(12) United States Patent (10) Patent No.: US 9,660,494 B2
Parviainen et al. (45) Date of Patent: May 23, 2017

(54) JOINT AND JOINTING METHOD IN A PERMANENT MAGNET SYNCHRONOUS MACHINE

(75) Inventors: Asko Parviainen, Lappeenranta (FI); Ari Piispanen, Lappeenranta (FI)

(73) Assignee: AXCO-Motors Oy, Lappeenranta (FI)

( * ) Notice: Subject to any disclaimer, the term of this patent is extended or adjusted under 35 U.S.C. 154(b) by 878 days.

(21) Appl. No.: 13/981,731

(22) PCT Filed: Jan. 25, 2012

(86) PCT No.: PCT/FI2012/050064
§ 371 (c)(1),
(2), (4) Date: Oct. 14, 2013

(87) PCT Pub. No.: WO2012/101327
PCT Pub. Date: Aug. 2, 2012

(65) Prior Publication Data
US 2014/0028144 A1 Jan. 30, 2014

(30) Foreign Application Priority Data
Jan. 26, 2011 (FI) ...................................... 20115075

(51) Int. Cl.
 *H02K 15/00* (2006.01)
 *H02K 3/16* (2006.01)
 *H02K 1/22* (2006.01)
 *H02K 21/12* (2006.01)
(52) U.S. Cl.
 CPC ............... *H02K 3/16* (2013.01); *H02K 1/223* (2013.01); *H02K 21/12* (2013.01); *H02K 15/0012* (2013.01)
(58) Field of Classification Search
 CPC ...... H02K 3/16; H02K 15/0012; H02K 1/223; H02K 1/22; H02K 1/27; H02K 21/12; H02K 21/46

USPC ......... 310/210, 211, 156.78–156.84; 29/598, 29/825, DIG. 4; 228/262.31, 262.42,
IPC ............. H02K 3/16,15/0012, 1/223, 1/22, 1/27, 21/12, 21/46
(Continued)

(56) References Cited

U.S. PATENT DOCUMENTS 4,490,638 A 12/1984 Lind
5,736,707 A 4/1998 Nied et al.
(Continued)

FOREIGN PATENT DOCUMENTS

CA 1 253 560 A1 5/1989
EP 2 066 005 A2 6/2009
JP 11-103548 A 4/1999

OTHER PUBLICATIONS

International Search Report for corresponding International Patent Application No. PCT/FI2012/050064 mailed Apr. 11, 2012.

*Primary Examiner* — Michael Andrews
(74) *Attorney, Agent, or Firm* — Merchant & Gould P.C.

(57) ABSTRACT

The invention relates to a joint between a copper short-circuiting ring (1) and a copper bar (2) of the damper winding in a permanent magnet synchronous machine, wherein the end of the bar is jointed to a hole (9) disposed in the short-circuiting ring by welding them together at the mating surfaces. Further, the invention relates to a corresponding method. According to the invention the short-circuiting ring (1) includes a blocking structure for limiting the heat flux from being conducted further into the short-circuiting ring from the weld between the short-circuiting ring and the bar.

6 Claims, 3 Drawing Sheets

Figure 1:
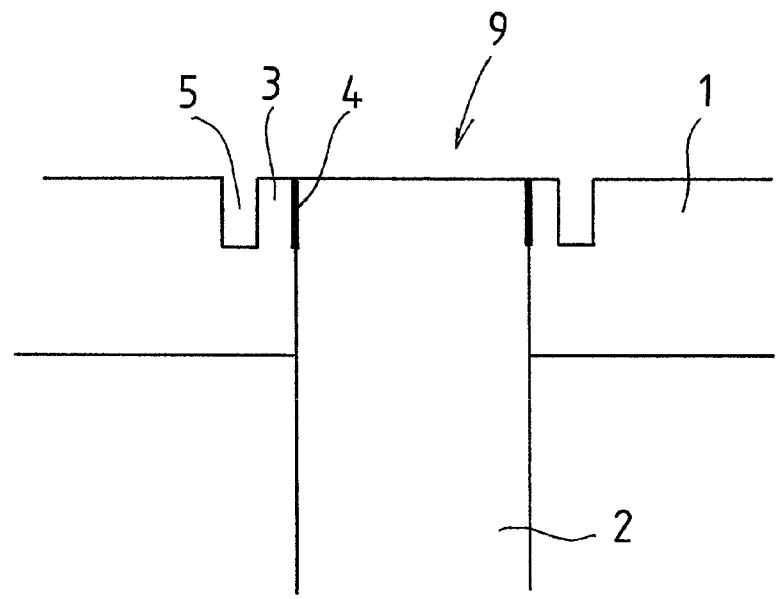

(58) Field of Classification Search
USPC ............ 228/262.45, 262.51, 262.61, 262.72, 228/262.8, 262.9; 219/615
See application file for complete search history.

(56) References Cited

U.S. PATENT DOCUMENTS

2005/0000076 A1* 1/2005 Painchault ............... B23K 1/20
228/262.42
2006/0267441 A1* 11/2006 Hang ................ H02K 15/0012
310/211
2006/0273683 A1 12/2006 Caprio et al.

* cited by examiner

JOINT AND JOINTING METHOD IN A PERMANENT MAGNET SYNCHRONOUS MACHINE

This application is a National Stage Application of FI2012/050064, filed 25 Jan. 2012, which claims benefit of Serial No. 20115075, filed 26 Jan. 2011 in Finland and which applications are incorporated herein by reference. To the extent appropriate, a claim of priority is made to each of the above disclosed applications.

FIELD OF THE INVENTION

The invention relates to a joint and to a method for welding together a copper short-circuiting rings and a copper bar of the damper winding in a permanent magnet synchronous machine.

BACKGROUND OF THE INVENTION

A permanent magnet synchronous machine running directly on the network requires a traditional synchronous machine type damper winding for the rotor. Preferably, the damper winding is manufactured from copper.

In a traditional synchronous machine, the bars of the damper winding and the short-circuiting ring are typically soldered together. Soldering requires a significant degree of heat input to the soldered site. Since copper conducts heat very well, it is effectively transferred to the rotor. In the case of manufacturing a rotor for a traditional synchronous machine, that is not a problem.

However, the permanent magnets in a permanent magnet synchronous machine do not withstand high temperatures; instead, the temperature in this type of almost open magnetic circuit must be kept below 100° C. Therefore, the joint between the copper bars of the damper winding and the copper short-circuiting ring is to be provided in another manner.

Welding is a better jointing method than soldering for copper parts for the reason that it is quicker and the necessary quantity of heat is lower. However, if the short-circuiting ring and a bar of the damper winding were welded directly together, heat would be conducted to the permanent magnets to such extent as to destroy them.

OBJECTIVE OF THE INVENTION

An objective of the invention is to remedy the defects of the prior art referred to above. In particular, it is an objective of the invention to provide a novel welding method and a joint by which a copper short-circuiting ring and a copper bar of the damper winding can be welded together without destroying the permanent magnets in a permanent magnet synchronous machine.

SUMMARY OF THE INVENTION

In the joint according to the invention between a copper short-circuiting ring and a copper bar of the damper winding in a permanent magnet synchronous machine, the end of the bar is jointed to a hole disposed in the short-circuiting ring by welding them together at the mating surfaces. According to the invention, the short-circuiting ring includes a blocking structure for limiting the heat flux from being conducted further to the short-circuiting ring from the weld between the short-circuiting ring and the bar. The blocking structure according to the invention thus blocks the transfer of heat from the area of the welding to be performed. First of all, this prevents excessive heating of the adjacent permanent magnets and their destruction. Secondly, the blocking structure retains heat within the area of the weld in such a way that the temperature needed for the weld is reached with a lower total heat quantity. This way, welding can be carried out faster and with less heat by virtue of the blocking structure.

In one embodiment of the invention the blocking structure is formed by a sleeve-type framing around the hole, whereby the welded joint between the short-circuiting ring and the bar is formed between the sleeve-type framing of the hole of the short-circuiting ring and the bar.

The melting point of copper is 1083° C., and this temperature is to be reached for the seam when welding copper. On the other hand, the highest allowable temperature for permanent magnets is approximately 100° C. These are the temperature values that cannot be changed. Therefore, the invention is premised on using a lower total heat quantity and concentrating it more precisely and faster by the blocking structure to the area of the seam to be welded.

Therefore, the basic idea of the invention is to limit the free conduction of heat in copper forth and toward the permanent magnets. This way, as heat is concentrated or more precisely kept within a limited area, i.e. the welding area, the quantity of heat needed for welding will be lower and welding carried out faster. When welding can be made faster, the quantity of heat transferred to copper will be lower, and therefore the quantity of heat conducted through copper toward the magnets will likewise be lower, which automatically leads to lower temperatures at the permanent magnets.

In one embodiment of the invention the blocking structure is formed by a ring-type groove made around the hole at a distance therefrom. This way, the open groove would not conduct heat to a significant extent; instead, the heat will be concentrated to the welded seam. In another embodiment of the invention the sleeve-type framing of the blocking structure is formed by a ring-type sheath extending upward from the surface of the short-circuiting ring at the edge of the hole. In terms of operation, both structures are similar, i.e. heat will not be able freely to be conducted in the direction of the surface of the short-circuiting ring, but in the first instance in the direction of the welded seam and the bar, when the bar is being welded into the hole disposed in the short-circuiting ring.

In a preferred embodiment of the invention the end of the bar is also shaped for limiting the free transfer of heat and concentrating heat more precisely and faster just to the seam to be welded. To this effect, the end of the bar includes a central recess, which constitutes a sleeve-type framing to the end of the bar. Thus, the short-circuiting ring and the end of the bar both comprise tubular and relatively thin parts, in the area of which they are to be welded together. Heat needed for welding is concentrated to the area of these tubular parts and will not to be conducted immediately to the short-circuiting ring or to the bar in the transverse direction.

Further, the invention relates to a method for welding together a copper short-circuiting ring and a copper bar of the damper winding in a permanent magnet synchronous machine, wherein the end of the bar is jointed to a hole disposed in the short-circuiting ring by welding them together at the mating surfaces. According to the invention at least one of the pieces to be welded is shaped in the vicinity of the mating surfaces to be welded so that the free conduction of heat outside the weld in the pieces to be welded is limited.

In one embodiment of the invention the free conduction of heat to the short-circuiting ring is limited by machining a groove around the hole disposed in the short-circuiting ring, to a distance from the hole. Further, the free conduction of heat toward the permanent magnets can be limited by providing a central opening to the end of the bar.

In addition to heat causing damage to the permanent magnets, problems in welding are caused or welding may even be prevented by the magnetic fields acting in the area to be welded. Molten copper does not stay in place in the weld but flies out of place under a strong magnetic field. On this account, the magnetic circuit of a permanent magnet synchronous machine is preferably short-circuited in the welding area before the welding to minimize the magnetic fluxes that would prevent welding. The short-circuit may be made by a massive iron mass extending from under the short-circuiting ring of the rotor, from around the bars and from the contact therewith, along the outer casing of the rotor in the area to be welded. The massive mass enables minimization of leakage fluxes, which by itself makes welding possible. In addition, short-circuiting the poles changes the point of operation of the permanent magnets so that the magnets withstand higher temperatures without thermal degeneration. Further, the massive piece absorbs heat, reducing heating of the magnets in the welding area. In addition, the massive piece may include a cooling circulation based on a flowing liquid or gas to enhance cooling of the pole in the area to be welded.

The joint and the method according to the invention provide considerable advantages as compared to the prior art. The invention enables welding together of the short-circuiting ring and a bar of the damper winding in a permanent magnet synchronous machine without damaging the permanent magnets. Further, welding may be made faster and with a lower heat quantity by the invention than in the prior art without in any way diluting the quality of the provided weld.

LIST OF FIGURES

Figure 2:
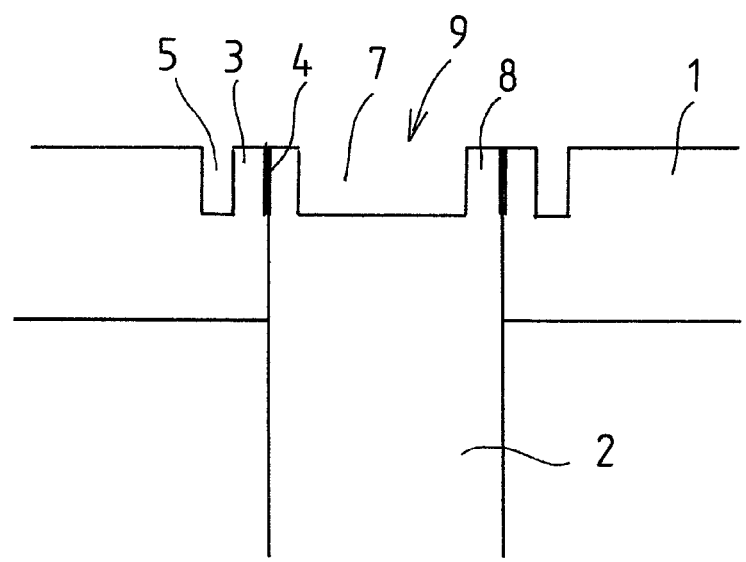
Figure 3:
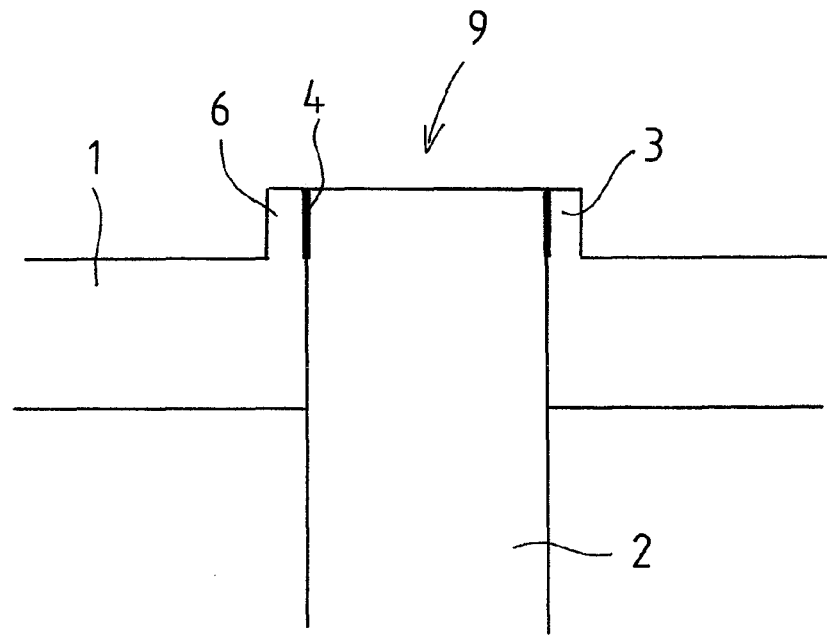
Figure 4:
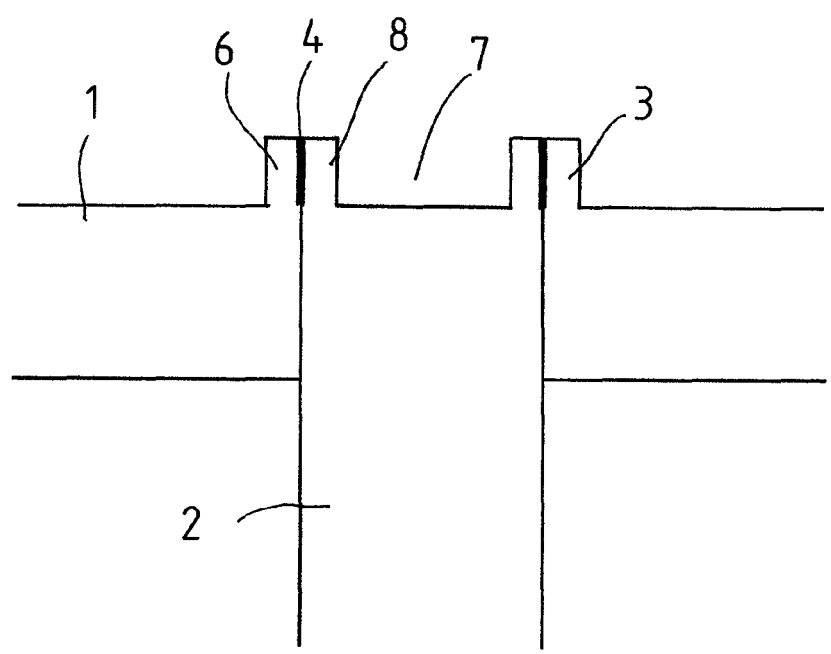
Figure 5:
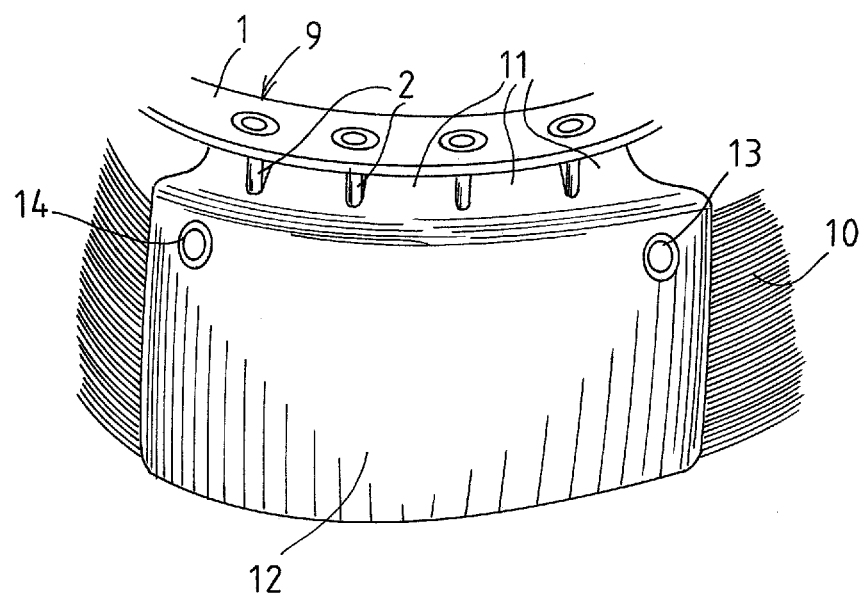

Below, the invention will be described in detail with reference to the accompanying drawings, in which FIG. 1 presents one joint according to the invention,
FIG. 2 presents a second joint according to the invention,
FIG. 3 presents a third joint according to the invention,
FIG. 4 presents a fourth joint according to the invention, and
FIG. 5 schematically presents short-circuit of a magnetic circuit.

DETAILED DESCRIPTION OF THE INVENTION

In the embodiment of the invention presented by FIG. 1 a copper short-circuiting ring 1 includes a hole 9, the cross-sectional shape of which corresponds to the cross section of a copper bar 2 to be welded thereto in such a way that they are provided relatively tightly the mating surfaces against each other. The bar 2 is a straight piece of a uniform thickness and a straight end. A ring-shaped groove 5 has been made to the surface of the short-circuiting ring 1 in a circulating fashion around the hole 9 and to a distance from the hole in such a way as to provide a sleeve-type framing 3 between the hole 9 and the groove 5.

The welded joint 4 between the short-circuiting ring 1 and the bar 2 is then provided mainly over the height of the sleeve-type framing 3. As welding is performed in the area of the framing 3, heat will not be able directly to be conducted to the surrounding short-circuiting ring 1 because the groove 5 blocks the conduction of heat. This way, heat is more precisely concentrated to the area of the welded joint 4, whereby the total heat quantity needed for welding will be lower, which obviously reduces the temperatures in different parts of the whole piece during and after welding.

FIG. 2 presents an even more effective embodiment than the embodiment of FIG. 1, wherein a recess 7, i.e. a drilling of a suitable length, has been added to the end of the copper bar 2 of the embodiment of FIG. 1. It is, for example, equally deep as the groove 5 surrounding the hole 9. Thus, the outer perimeter of the end of the bar 2 is also provided with a sleeve-type framing 8. This way, the welded joint 4 is produced between two sleeve-type framings 3 and 8, i.e. as a nested joint of two relatively thin tubes. Thus, the heat generated during welding will not be able to be conducted outward or inward, but only in the longitudinal direction of welding, i.e. of the bar. In this case, welding is carried out quickly, and the welded seam can be heated to the necessary welding temperature by a low quantity of heat.

FIG. 3 presents an embodiment of the invention wherein the blocking structure according to FIGS. 1 and 2, i.e. the groove 5, has been replaced by another type of structure. Around the hole 9 of the short-circuiting ring 1, upward from the surface of the ring, there has been formed a ring-type sheath 6, i.e. a rim that increases the length of the hole 9 from the thickness of the short-circuiting ring. As the end of the bar 2 is then placed flush with the edge of this ring-shaped sheath 6, the welded joint 4 can be made between the end of the bar and the sheath 6 in such a way that heat is not allowed to be conducted to a significant extent to the short-circuiting ring in the horizontal direction in the figure.

FIG. 4 is a more effective embodiment improved relative to the embodiment of FIG. 3 and corresponding to the embodiment of FIG. 2. It shows that the end of the bar 2 is also provided with a recess 7, i.e. a drilling 7, which constitutes between the bar and the short-circuiting ring only thin tubular rings, between which the welded joint 4 is made, in a manner corresponding to the embodiment of FIG. 2.

FIG. 5 schematically presents part of the rotor of a permanent magnet synchronous machine. The end of the rotor is provided with a copper short-circuiting ring 1 comprising holes 9 into which copper bars 2 of the damper winding are to be welded. The body 10 of the rotor having a laminated structure is not engaged to the short-circuiting ring 1 but is disposed at a distance therefrom, so that the body 10 is supported to the short-circuiting ring 1 through the bars 2.

The permanent magnets buried inside the body 10 cause a strong magnetic field that includes the area to be welded between the short-circuiting ring and the bars, which prevents the welding. To this account, the magnetic circuit of the permanent magnet synchronous machine is to be short-circuited over the area to be welded to minimize the magnetic flux that prevents welding. In accordance with FIG. 5, the short-circuit is made by a massive piece of iron 12 provided with finger-type projections 11 that extend between the bars 2 under the short-circuiting ring 1 and are disposed in direct galvanic contact to the bars. The piece 12 extends on the surface of the rotor body 10 in the axial as well as circumferential direction, covering the rotor in such a way that it sufficiently short-circuits the magnetic circuit over the area to be welded.

Connectors 13 and 14 have also been drawn for the piece of iron 12, and the piece of iron is provided with a flow channel that connects the connectors 13 and 14 to each other. By connecting suitable hoses to the connectors, a suitable cooling liquid or gas can be circulated through the piece of iron. This blocks the transfer of heat via the bars 2 to the body 10 and further from the body to the permanent magnets.

The invention is not limited merely to the examples referred to above; instead, many variations are possible within the scope of the inventive idea defined by the claims.

The invention claimed is:

1. A method for welding together a copper short-circuiting ring and a copper bar of a damper winding in a permanent magnet synchronous machine, wherein an end of the bar is jointed to a hole disposed in the copper short-circuiting ring by welding the copper bar and the copper short-circuiting ring together at mating surfaces, wherein at least one of the copper bar and the copper short-circuiting ring to be welded is shaped in a vicinity of the mating surfaces to be welded so that free conduction of heat outside the weld in the copper bar or the copper short-circuiting ring to be welded is limited, and wherein a magnetic circuit of the permanent magnet synchronous machine is short-circuited before welding for an area to be welded to minimize leakage of flux preventing the welding.

2. The method according to claim 1, wherein the free conduction of heat to the bar is limited by providing the end of the bar with a central recess.

3. The method according to claim 1, wherein the free conduction of heat to the short-circuiting ring is limited by machining a groove around the hole disposed in the short-circuiting ring, to a distance from the hole.

4. The method according to claim 1, wherein the short-circuit is made by an iron mass extending from under the short-circuiting ring of a rotor, from around the bars and from contact thereto, along the outer casing of the rotor in the vicinity of the mating surfaces to be welded.

5. The method according the claim 4, wherein the iron mass is used to cool the permanent magnet poles of the rotor at the bars to be welded.

6. The method according to claim 5, wherein the iron mass is cooled by a cooling circulation surrounding the iron mass and/or passing through the iron mass.

* * * * *